(12) United States Patent
Krafthefer et al.

(10) Patent No.: US 9,145,815 B2
(45) Date of Patent: Sep. 29, 2015

(54) SYSTEM AND METHOD FOR SENSING PARTICULATE MATTER

(75) Inventors: Brian C. Krafthefer, Stillwater, MN (US); Gary Richard O'Brien, Jr., Riverview, MI (US); Gregory J. Hampson, Stillwater, NY (US)

(73) Assignee: Honeywell International Inc., Morristown, NJ (US)

( * ) Notice: Subject to any disclaimer, the term of this patent is extended or adjusted under 35 U.S.C. 154(b) by 1358 days.

(21) Appl. No.: 12/944,263

(22) Filed: Nov. 11, 2010

(65) Prior Publication Data

US 2012/0117945 A1     May 17, 2012

(51) Int. Cl.
*F01N 3/00*     (2006.01)
*F01N 11/00*     (2006.01)

(52) U.S. Cl.
CPC .............. *F01N 11/00* (2013.01); *F01N 2560/05* (2013.01); *F01N 2900/1402* (2013.01); *F01N 2900/1606* (2013.01); *Y02T 10/47* (2013.01)

(58) Field of Classification Search
CPC ............... F01N 11/00; F01N 2560/05; F01N 2900/1402; F01N 2900/1606; Y02T 10/47
USPC ............................. 60/274, 276, 277, 297, 311
See application file for complete search history.

(56) References Cited

U.S. PATENT DOCUMENTS

| 6,018,944 | A | * | 2/2000 | Davey et al. ..................... 60/274 |
| 6,112,518 | A | * | 9/2000 | Jerger et al. ..................... 60/274 |
| 8,151,560 | B2 | * | 4/2012 | Zanini-Fisher et al. ........ 60/297 |

* cited by examiner

*Primary Examiner* — Thomas Denion
*Assistant Examiner* — Diem Tran
(74) *Attorney, Agent, or Firm* — Schwegman Lundberg & Woessner, P.A.

(57) ABSTRACT

A computerized method includes receiving signals from a particulate matter sensor relating to an amount of particulates at a point in time within a time period in a diesel engine exhaust stream, calculating one or more running statistical parameters relating to a particle mass in the diesel engine exhaust stream, determining an upper control limit for the amount of particulates, receiving a threshold for an allowable amount of particulates in the diesel engine exhaust stream, comparing the threshold to one or more of (a) a current instantaneous particulate reading from the particulate matter sensor and (b) the upper control limit for the amount of particulates, and generating an output signal when one or more of the current instantaneous particulate reading and the upper control limit for the amount of particulates are above the threshold.

18 Claims, 8 Drawing Sheets

SYSTEM AND METHOD FOR SENSING PARTICULATE MATTER

TECHNICAL FIELD

The present disclosure relates to sensing particulate matter, and in an embodiment, but not by way of limitation, to a system and method for determining when particulate matter levels are outside a control limit (for a diesel particulate filter).

BACKGROUND

Diesel particulate filters (DPF) are required on many modern diesel powered vehicles. During the trapping mode of operation, increasing soot loading in the DPF creates back pressure on the engine, thereby degrading fuel economy and engine performance with a potential of engine damage. High temperatures during regeneration can lead to DPF failures, such as cracking, resulting in leakage of particulates. Original Equipment Manufacturers (OEMs) are required by the Environmental Protection Agency (EPA) to certify with on-board diagnostics (OBD) that their diesel emissions control system is functioning normally and the emissions of particulate matter (PM) are below a certification limit (0.01 g/hp-hr), and to detect loss of performance before the actual emissions of PM exceed the threshold (0.05 g/hp-hr) (for all engine families starting in 2013, and for one engine family starting 2010). Today, the best available solution is to monitor the engine operation and the pressure drop across the DPF as well as the DPF regeneration control system with software within the engine control unit to detect loading of the DPF as well as problems with the equipment. However, the current best approach does not directly or accurately measure DPF loading or performance and thus cannot insure compliance.

DETAILED DESCRIPTION

Figure 1:
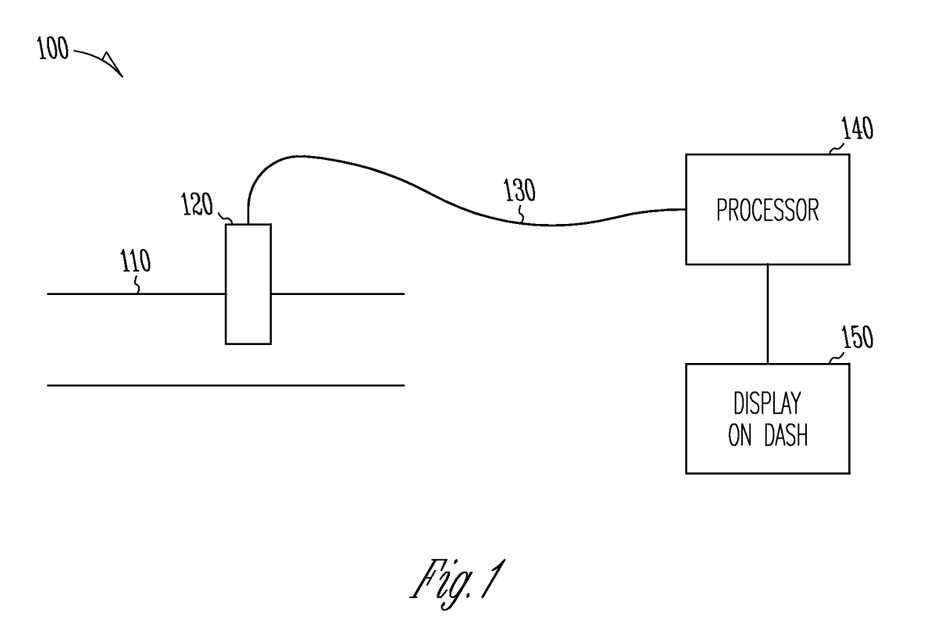
FIG. 1 illustrates an example embodiment of a particulate matter sensor system.

FIG. 1 illustrates an example embodiment of a particulate matter sensor system 100. The system 100 includes a particulate matter sensor 120 positioned within a diesel exhaust stream 110. A line 130 couples the sensor 120 to a processor 140. The processor 140 includes algorithms that determine whether a particulate matter distribution is within limits (a threshold) or is in an excursion over an upper control limit (UCL). The processor can report the status of the particulate matter level vis-à-vis the UCL to a display 150 or into the engine control unit. The display 150 can be on the dashboard of a vehicle.

An installation of a particulate matter (PM) sensor directly in a diesel exhaust stream after a diesel particulate filter (DPF) can be an effective means of insuring compliance with emission standards. A problem however is to detect the PM levels and identify a single operating condition as belonging to a distribution below an on board diagnosed (OBD) threshold from those operating conditions which rightly belong to the distribution above the OBD threshold. Examples of such distributions below a threshold 250, approaching the threshold 250, and exceeding the threshold 250 are illustrated respectively at 210, 220, and 230 in FIG. 2.

Figure 2:
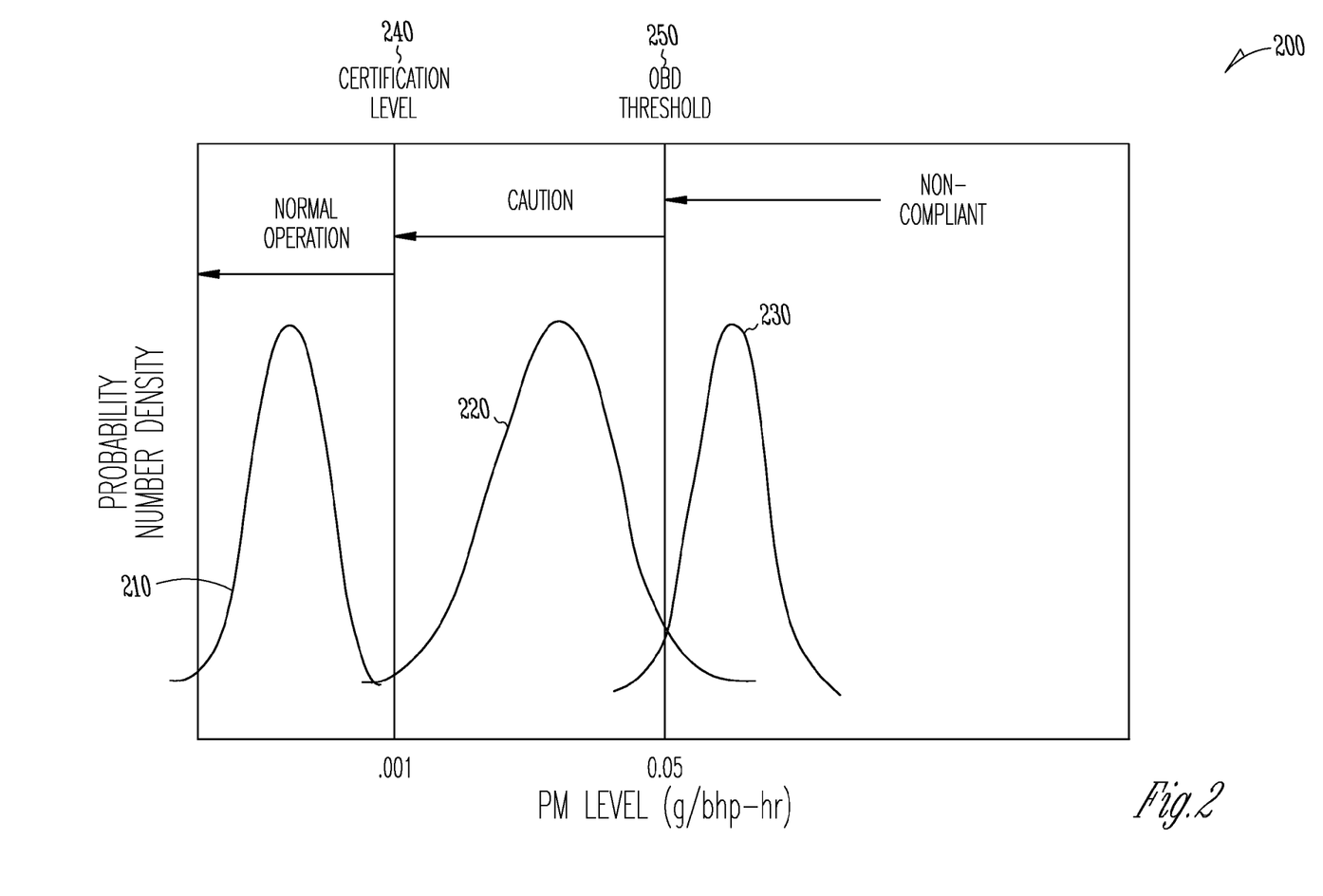
FIG. 2 illustrates several distributions around operating conditions of a particulate matter sensor system.

Specifically, FIG. 2 illustrates a set of "measured distributions" around three operating conditions. This illustrates that with all operating conditions, the "true" particulate matter level cannot be known exactly, but is known by a distribution around the true PM level. A challenge of a PM sensor for an OBD application is to faithfully determine if a given operating condition belongs to a compliant distribution or non-compliant distribution. In other words, is the operating condition compliant, but happens to look non-compliant due to measurement uncertainty? Similarly, is a non-compliant operating condition being measured as compliant when it is in fact not compliant, and should a more precise measurement therefore be made? FIG. 2 shows that to be successful as an OBD sensor, the PM sensor and its algorithm must distinguish between a compliant and non-compliant distribution.

An embodiment uses a charged-based PM sensor (cbPM) to detect an engine and/or after-treatment system failure. In this embodiment, a minimum condition for detecting DPF failure is the detection of a PM level in excess of an OBD threshold of 0.05 g/bh-hr. This embodiment is related to the signal conditioning and processing of the cbPMs that are installed post-DPF location. This embodiment includes an algorithm and electronic signal conditioning unit that continuously monitor the PM sensor signal. The PM sensor and its algorithm have the ability to distinguish between a compliant and non-compliant distribution, as shown in FIG. 2. This is achieved by the use of one or more of (a) signal conditioning that rejects noise through either Fourier Transform, time averaging, or other noise rejection method; (b) data logging over the course of operation wherein the filtered signal is recorded in a data base within the PM sensor electronics box; and (c) statistical methods such as a historical mean and standard deviation for a "normal" signal that are maintained and used to establish the distribution for a properly functioning DPF.

Non-compliance is detected by discrimination at the end of a sampling interval to determine if the operating condition for that sampling interval is consistent with a running historical averaged distribution's Upper Control Limit or UCL (defined by a mean, standard deviation, and an upper control limit which is a number of standard deviations above the mean). Once an operating condition is found to be above the running distribution UCL, it is flagged, even if it is below the threshold itself, and the number of flagged operating conditions is logged. If the number of flagged conditions increases suddenly over a period of time, the sensor will indicate deterioration of the DPF. Similarly, if the running value for the upper control limit of the running distribution, wherein as stated above the UCL is equal to the mean plus a number of standard deviations, is moving upward over time, this is flagged as deterioration of the DPF. Additionally, if the running value for the upper control limit of the running distribution is above the OBD threshold, the sensor sends a flag that it has lost the ability to distinguish an operating condition which belongs to the normal running distribution from one that is a true OBD excursion. If however, the UCL of the running distribution is below the threshold and an operating condition registers above the threshold, this condition is considered an OBD excursion and the event is communicated to an engine control unit (ECU). The system also has a reset button which zero's out the memory buffer and the logging of normal operation, and restarts the system from zero.

Figure 3:
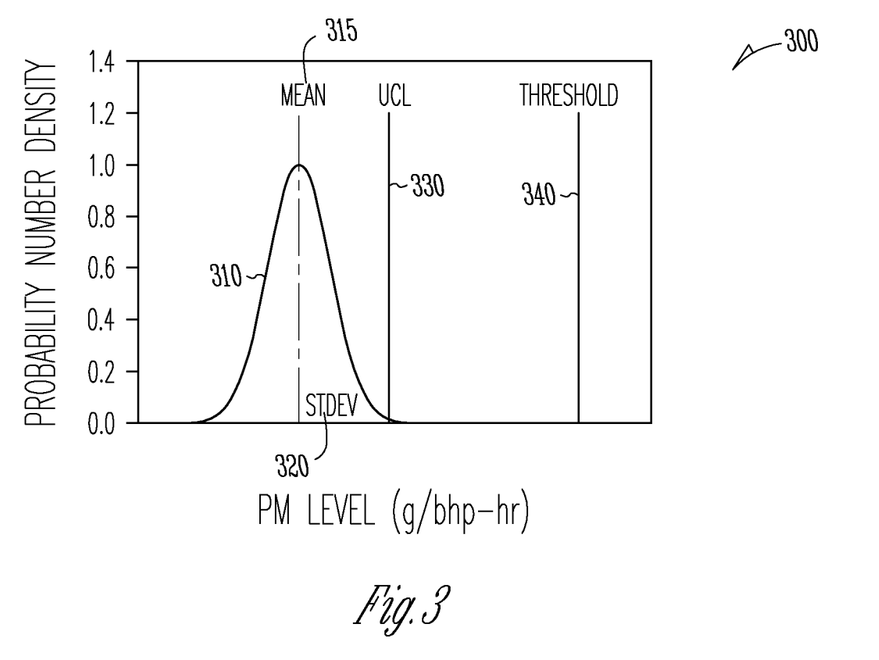
FIG. 3 illustrates a running distribution characterized by a mean, a standard deviation, and a computer upper control limit.

FIG. 3 illustrates a graph 300 of a running distribution 310 that is characterized by a mean 315, a standard deviation 320, and a computed upper control limit (UCL) 330 relative to a threshold 340 for a properly functioning DPF. The UCL 330 is calculated by adding to the mean 315 a number ($\lambda$) of standard deviations 320. The number of standard deviations 320 is chosen by the OEM and is comprised of factors such as the need to quickly communicate the PDF failure and the information from the ECU on the vehicle engine operating parameters. FIG. 3 shows that the distribution via the UCL 330 is compared against the threshold 340, rather than comparing a single data point against the threshold 340. This method prevents false alarms based on a single or several of temporarily high individual particulate matter readings.

Figure 4:
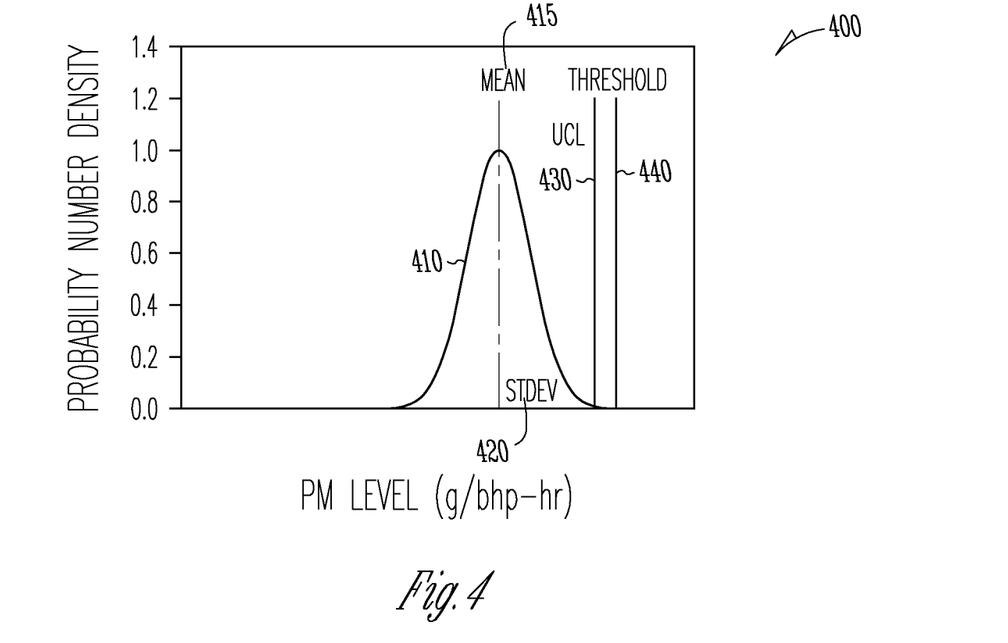
FIG. 4 illustrates a running distribution resulting from an upward shift or aging of particles.

FIG. 4 illustrates a graph 400 of a distribution 410 that could be the result of aging of a diesel system and a DPF in particular. The graph 400 shows the mean 415 and standard deviation 420, and further illustrates that the distribution 410 has shifted towards the threshold 440. However, the system is still compliant because the UCL 430 is below the threshold 440.

Figure 5:
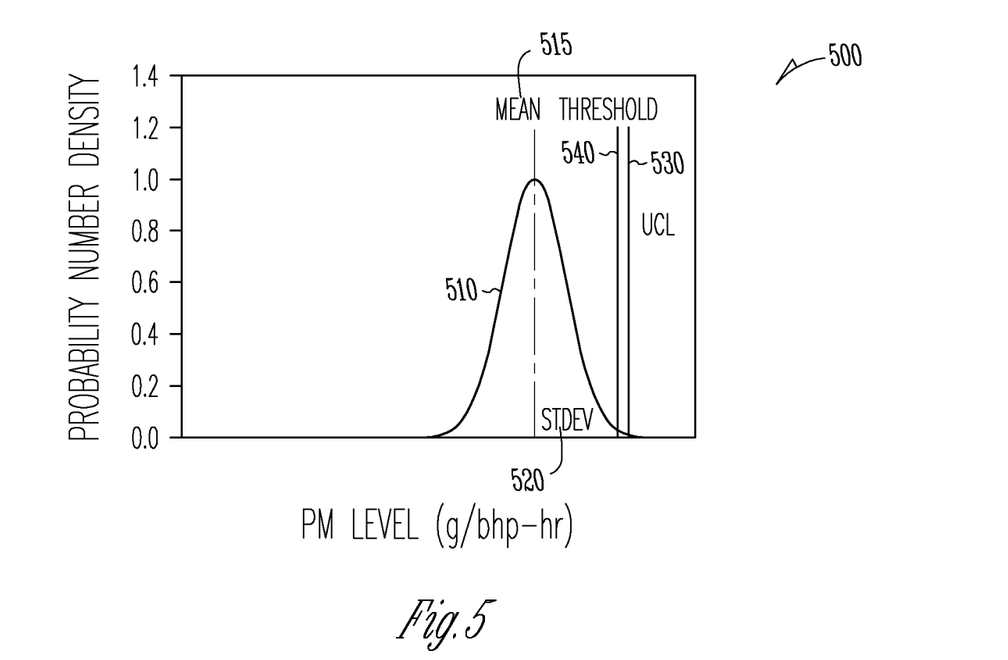
FIG. 5 illustrates a running distribution that has increased such that the upper control limit is greater than a threshold limit.

FIG. 5 illustrates a graph 500 with mean 515 and standard deviation 520, wherein the distribution 510 has shifted to high values such that the UCL 530 is greater than the threshold 540. This condition would be the result of a failed DPF, and an alarm would be sounded.

Figure 6:
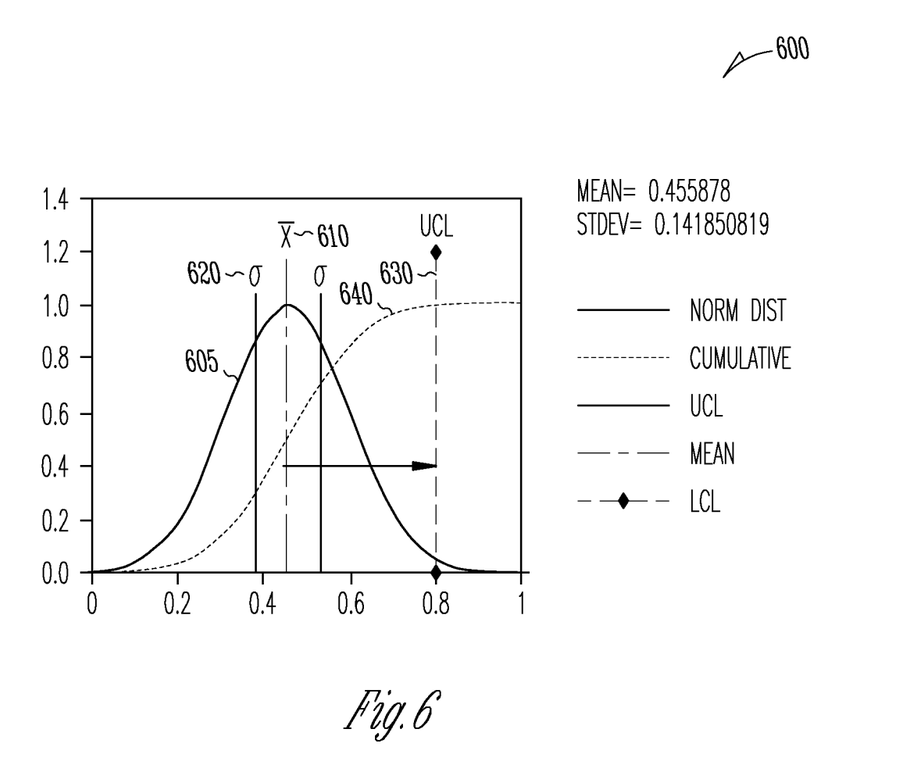
FIG. 6 illustrates a normalized distribution of an amount of particulate matter over a time period.
Figure 7A:
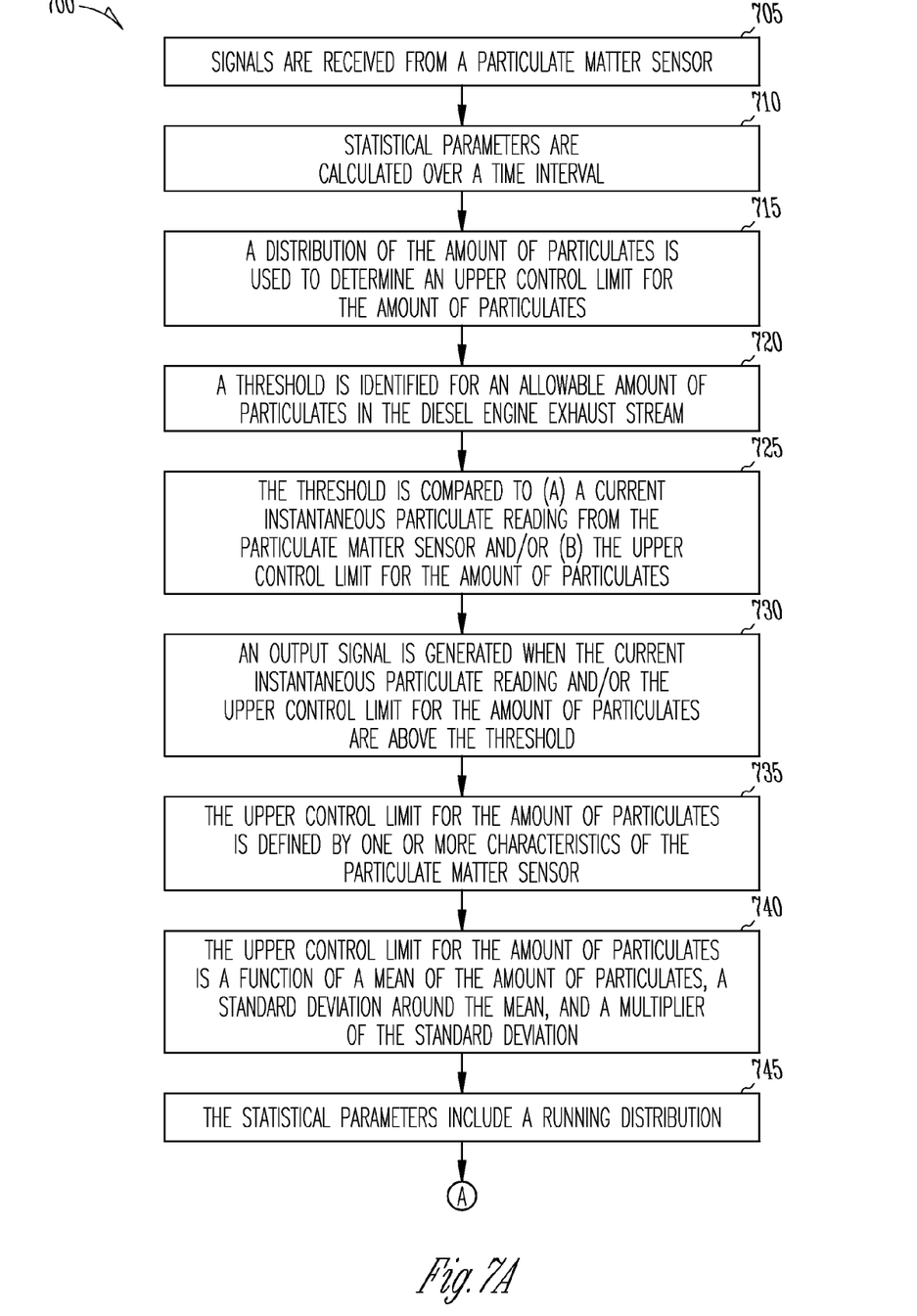
FIGS. 7A, 7B, and 7C illustrate an example process routine to determine an excursion of a level of particulate matter.
Figure 7B:
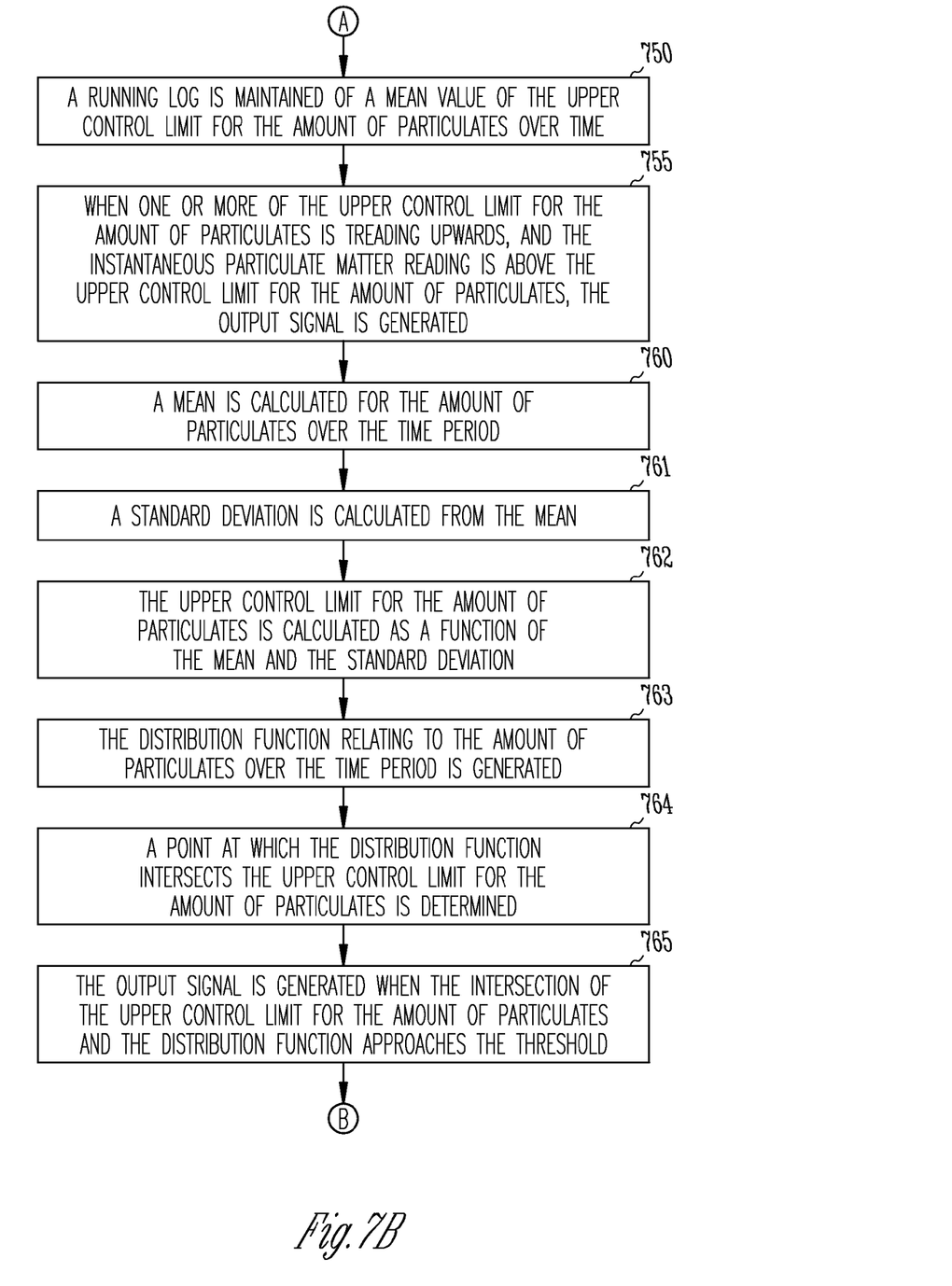
Figure 7C:
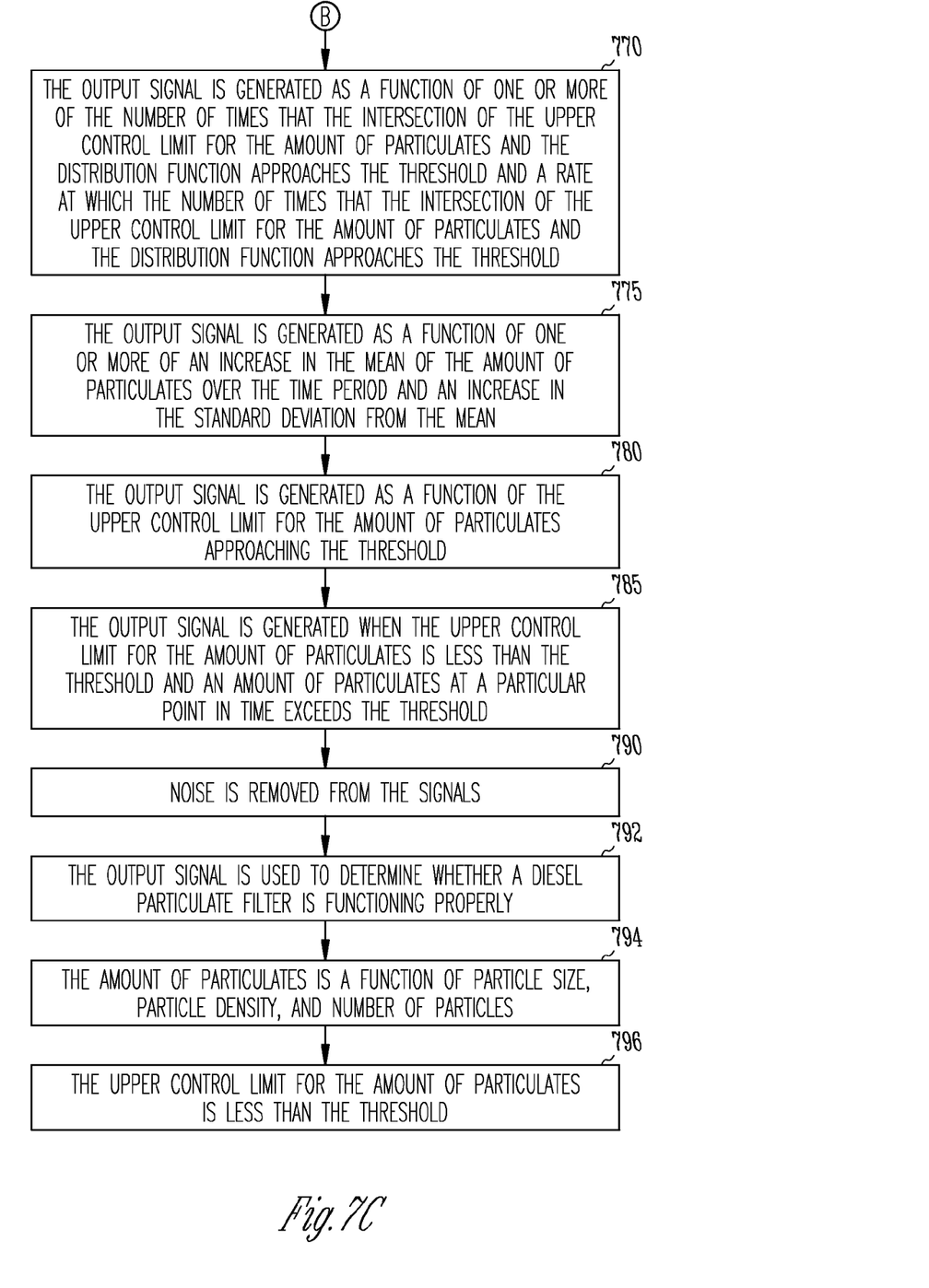

FIG. 6 illustrates a distribution of an amount of particulate matter over a time period that can be used in connection with the process 700 in FIG. 7 to determine if a distribution is within the UCL. FIG. 6 is a normal distribution 610 that is characterized by a mean 620 (Xbar), a standard deviation 630 (sigma), and an upper control limit 640 (UCL). The UCL 640 is defined as a number (lambda—$\lambda$) of standard deviations above the mean. A condition does not belong to the distribution if it lies above the UCL.

One or more embodiments include an algorithm, an approach, a statistical method (to compute mean, standard deviation, and UCL), an on-board memory, input and output channels, and a central processing unit (CPU) that is programmed to make decisions regarding greater than and less than the UCL, and is programmed with an ability to communicate with the engine control unit (ECU). This embodiment covers all of these elements together as well as subsets of them that serve the same purpose—the elimination of one element of the processing chain that does not invalidate the overall approach—that is, to monitor, store, determine a distribution, and determine a UCL as indicated above.

FIGS. 7A, 7B, and 7C are a flowchart of an example process 700 to determine an excursion of a level of particulate matter. FIGS. 7A, 7B, and 7C include a number of process blocks 705-796. Though arranged serially in the example of FIGS. 7A, 7B, and 7C, other examples may reorder the blocks, omit one or more blocks, and/or execute two or more blocks in parallel using multiple processors or a single processor organized as two or more virtual machines or sub-processors. Moreover, still other examples can implement blocks as one or more specific interconnected hardware or integrated circuit modules with related control and data signals communicated between and through the modules. Thus, any process flow is applicable to software, firmware, hardware, and hybrid implementations.

Referring specifically to FIGS. 7A, 7B, and 7C, at 705, signals are received from a particulate matter sensor. The signals relate to an amount of particulates at a point in time within a time period in a diesel engine exhaust stream. At 710, statistical parameters are calculated over a time interval. The statistical parameters relate to a particle mass in the diesel engine exhaust stream. At 715, a distribution of the amount of particulates is used to determine an upper control limit for the amount of particulates. This determination is made for the time interval of step 710. At 720, a threshold is identified for an allowable amount of particulates in the diesel engine exhaust stream. At 725, the threshold is compared to (a) a current instantaneous particulate reading from the particulate matter sensor and/or (b) the upper control limit for the amount of particulates. At 730, an output signal is generated when the current instantaneous particulate reading and/or the upper control limit for the amount of particulates are above the threshold.

At 735, the upper control limit for the amount of particulates is defined by one or more characteristics of the particulate matter sensor. Examples of such characteristics include whether mass concentration or number concentration is measured by the sensor, the sensor response time and/or integration time, the detection of other exhaust particle parameters (e.g., whether the particle is just carbon or whether there are hydrocarbons in the distribution), whether the density of the particles has been estimated or measured, and the drift of the sensor itself with time. At 740, the upper control limit for the amount of particulates is a function of a mean of the amount of particulates, a standard deviation around the mean, and a multiplier of the standard deviation. At 745, the statistical parameters include a running distribution.

At 750, a running log is maintained of a mean value of the upper control limit for the amount of particulates over time. At 755, when one or more of the upper control limit for the amount of particulates is trending upwards, and the instantaneous particulate matter reading is above the upper control limit for the amount of particulates, the output signal is generated.

In an embodiment, the calculation of the statistical measure can include several features. At 760, a mean is calculated for the amount of particulates over the time period. At 761, a standard deviation is calculated from the mean. At 762, the upper control limit for the amount of particulates is calculated as a function of the mean and the standard deviation. At 763, the distribution function relating to the amount of particulates over the time period is generated. At 764, a point at which the distribution function intersects the upper control limit for the amount of particulates is determined. At 765, the output signal is generated when the intersection of the upper control limit for the amount of particulates and the distribution function approaches the threshold.

At 770, the output signal is generated as a function of one or more of the number of times that the intersection of the upper control limit for the amount of particulates and the distribution function approaches the threshold and a rate at which the number of times that the intersection of the upper control limit for the amount of particulates and the distribution function approaches the threshold. At 775, the output signal is generated as a function of one or more of an increase in the mean of the amount of particulates over the time period and an increase in the standard deviation from the mean. At 780, the output signal is generated as a function of the upper control limit for the amount of particulates approaching the threshold. This indicates that the sensor cannot distinguish between the distribution of the amount of particulates and an excursion from the distribution of the amount of particulates. At 785, the output signal is generated when the upper control limit for the amount of particulates is less than the threshold and an amount of particulates at a particular point in time exceeds the threshold.

At 790, noise is removed from the signals. This noise removal aids in distinguishing between a compliant particulate matter distribution and a non-compliant particulate matter distribution. At 792, the output signal is used to determine whether a diesel particulate filter is functioning properly. At 794, the amount of particulates is a function of particle size, particle density, and number of particles. At 796, the upper control limit for the amount of particulates is less than the threshold.

Thus, an example particulate matter sensor system has been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the art disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The invention claimed is:

1. A method comprising:
   receiving signals from a particulate matter sensor relating to an amount of particulates at a point in time within a time period in a diesel engine exhaust stream;
   calculating one or more running statistical parameters, over a time interval, relating to a particle mass in the diesel engine exhaust stream;
   determining, using a distribution of the amount of particulates during the time interval, an upper control limit for the amount of particulates;
   receiving a threshold for an allowable amount of particulates in the diesel engine exhaust stream;
   comparing the threshold to one or more of (a) a current instantaneous particulate reading from the particulate matter sensor and (b) the upper control limit for the amount of particulates; and
   in response to the comparing, detecting an engine failure or an after-treatment system failure when one or more of the current instantaneous particulate reading and the upper control limit for the amount of particulates are above the threshold;
   wherein the upper control limit for the amount of particulates is defined by one or more characteristics of the particulate matter sensor.

2. The method of claim 1, wherein the upper control limit for the amount of particulates is a function of a mean of the amount of particulates, a standard deviation around the mean, and a multiplier of the standard deviation.

3. The method of claim 1, wherein the running statistical parameters include a running distribution.

4. The method of claim 1, comprising:
   maintaining a running log of a mean value of the upper control limit for the amount of particulates over time; and
   when one or more of the upper control limit for the amount of particulates is trending upwards, and the instantaneous particulate matter reading is above the upper control limit for the amount of particulates, generating the output signal.

5. The method of claim 1, comprising removing noise from the signals, thereby aiding in distinguishing between a compliant particulate matter distribution and a non-compliant particulate matter distribution.

6. The method of claim 1, comprising using the output signal to determine whether a diesel particulate filter is functioning properly.

7. The method of claim 1, wherein the amount of particulates is a function of particle size, particle density, and number of particles.

8. The method of claim 1, wherein calculating the one or more statistical measures comprises one or more of:
   calculating a mean for the amount of particulates over the time period;
   calculating a standard deviation from the mean;
   calculating the upper control limit for the amount of particulates as a function of the mean and the standard deviation;
   generating the distribution function relating to the amount of particulates over the time period;

determining a point at which the distribution function intersects the upper control limit for the amount of particulates; and generating the output signal when the intersection of the upper control limit for the amount of particulates and the distribution function approaches the threshold.

9. The method of claim 8, comprising generating the output signal as a function of one or more of the number of times that the intersection of the upper control limit for the amount of particulates and the distribution function approaches the threshold and a rate at which the number of times that the intersection of the upper control limit for the amount of particulates and the distribution function approaches the threshold.

10. The method of claim 8, comprising generating the output signal as a function of one or more of an increase in the mean of the amount of particulates over the time period and an increase in the standard deviation from the mean.

11. The method of claim 8, comprising generating the output signal as a function of the upper control limit for the amount of particulates approaching the threshold, thereby indicating that the sensor cannot distinguish between the distribution of the amount of particulates and an excursion from the distribution of the amount of particulates.

12. The method of claim 8, comprising generating the output signal when the upper control limit for the amount of particulates is less than the threshold and an amount of particulates at a particular point in time exceeds the threshold.

13. A non-transitory computer readable medium comprising instructions that when executed by a computer processor execute a process comprising:

receiving signals from a particulate matter sensor relating to an amount of particulates at a point in time within a time period in a diesel engine exhaust stream;

calculating one or more running statistical parameters, over a time interval, relating to a particle mass in the diesel engine exhaust stream;

determining, using a distribution of the amount of particulates during the time interval, an upper control limit for the amount of particulates;

receiving a threshold for an allowable amount of particulates in the diesel engine exhaust stream;

comparing the threshold to one or more of (a) a current instantaneous particulate reading from the particulate matter sensor and (b) the upper control limit for the amount of particulates; and in response to the comparing, detecting an engine failure or an after-treatment system failure when one or more of the current instantaneous particulate reading and the upper control limit for the amount of particulates are above the threshold;

wherein the upper control limit for the amount of particulates is defined by one or more characteristics of the particulate matter sensor.

14. The non-transitory computer readable medium of claim 13, comprising instructions for:

maintaining a running log of a mean value of the upper control limit for the amount of particulates over time; and when one or more of the upper control limit for the amount of particulates is trending upwards, and the instantaneous particulate matter reading is above the upper control limit for the amount of particulates, generating the output signal.

15. The non-transitory computer readable medium of claim 13, wherein the instructions for calculating the one or more statistical measures comprise instructions for one or more of:

calculating a mean for the amount of particulates over the time period;

calculating a standard deviation from the mean;

calculating the upper control limit for the amount of particulates as a function of the mean and the standard deviation;

generating the distribution function relating to the amount of particulates over the time period;

determining a point at which the distribution function intersects the upper control limit for the amount of particulates; and generating the output signal when the intersection of the upper control limit for the amount of particulates and the distribution function approaches the threshold.

16. A system comprising:

one or more computer processors configured for:

receiving signals from a particulate matter sensor relating to an amount of particulates at a point in time within a time period in a diesel engine exhaust stream;

calculating one or more running statistical parameters, over a time interval, relating to a particle mass in the diesel engine exhaust stream;

determining, using a distribution of the amount of particulates during the time interval, an upper control limit for the amount of particulates;

receiving a threshold for an allowable amount of particulates in the diesel engine exhaust stream;

comparing the threshold to one or more of (a) a current instantaneous particulate reading from the particulate matter sensor and (b) the upper control limit for the amount of particulates; and in response to the comparing, indicating an aging of a diesel system associated with the diesel exhaust system when one or more of the current instantaneous particulate reading and the upper control limit for the amount of particulates are above the threshold;

wherein the upper control limit for the amount of particulates is defined by one or more characteristics of the particulate matter sensor.

17. The system of claim 16, comprising one or more computer processors configured for:

maintaining a running log of a mean value of the upper control limit for the amount of particulates over time; and when one or more of the upper control limit for the amount of particulates is trending upwards, and the instantaneous particulate matter reading is above the upper control limit for the amount of particulates, generating the output signal.

18. The system of claim 16, wherein the one or more computer processors configured for calculating the one or more statistical measures are configured for:

calculating a mean for the amount of particulates over the time period;

calculating a standard deviation from the mean;

calculating the upper control limit for the amount of particulates as a function of the mean and the standard deviation;

generating the distribution function relating to the amount of particulates over the time period;

determining a point at which the distribution function intersects the upper control limit for the amount of particulates; and generating the output signal when the intersection of the upper control limit for the amount of particulates and the distribution function approaches the threshold.

* * * * *